Aug. 10, 1965   A. P. SCHOLTZ   3,199,682
COFFEE MAKER CAN
Filed Dec. 27, 1960
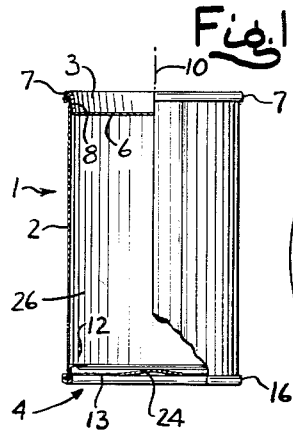
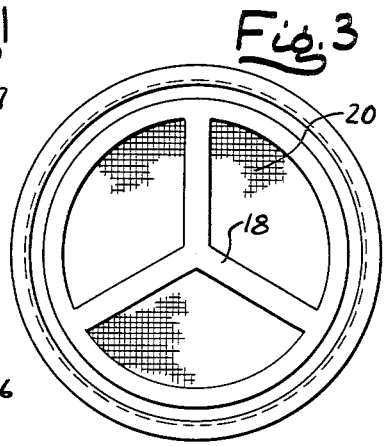
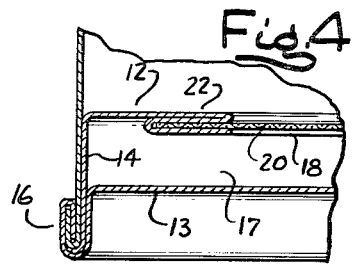
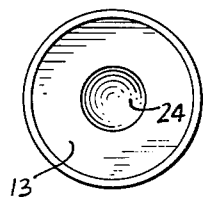
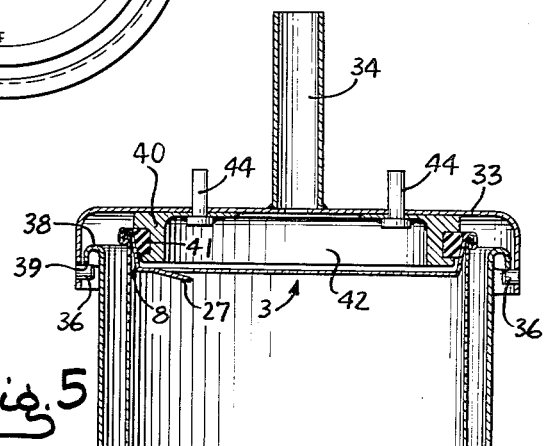
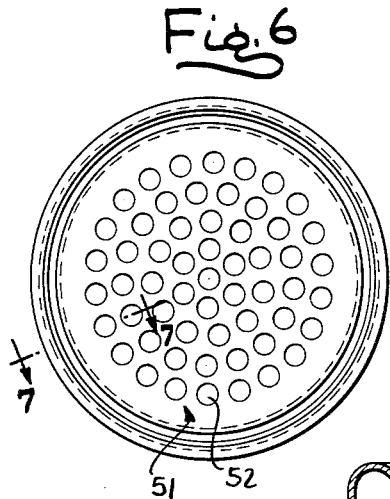
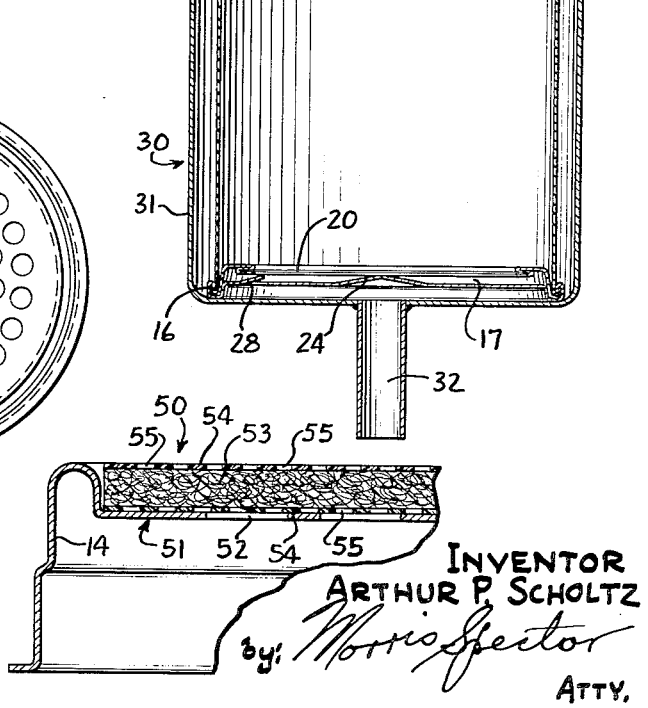
INVENTOR
ARTHUR P. SCHOLTZ
by: Morris Spector
ATTY.

3,199,682
COFFEE MAKER CAN
Arthur P. Scholtz, Chicago, Ill., assignor to National Can Corporation, Chicago, Ill., a corporation of Delaware
Filed Dec. 27, 1960, Ser. No. 78,423
1 Claim. (Cl. 210—479)

This invention relates to a container or can with a filter element therein. The invention is particularly useful for vacuum packing of ground coffee, wherein the can may be used as a cartridge in a coffee-brewing device.

Brewing devices are available for the making of drip coffee by passing hot water through a cartridge that holds the ground coffee. The cartridges now in use consist essentially of a plastic cup or shell having a removable wire screen bottom and a removable wire screen cover between which the ground coffee is placed. The coffee-containing cartridge is placed in the brewing mechanism. Hot water under approximately 15 pound pressure is then forced into the mechanism, flowing through the screen in the cover of the cartridge, then through the ground coffee, then through the screen at the bottom of the cartridge, and out through an opening in the bottom of the brewing mechanism. Such coffee brewing devices are used primarily on airplanes.

One disadvantage to this manner of packing coffee for brewing in flight lies in the fact that the packed coffee is unprotected from the atmosphere from the time it is placed in the cartridge until it is brewed in flight. Another disadvantage lies in the labor costs involved in cleaning the plastic cups of the coffee grounds preparatory for reuse of the cups on later flights.

It is one of the objects of the present invention to provide a vacuum packed cartridge for use in drip coffee brewing mechanism of the types above set forth, wherein the vacuum seal of the coffee cartridge is not broken until immediately prior to the insertion of the cartridge into the brewing receptacle. After completion of the coffee brewing the cartridge with its spent ground coffee is thrown away.

It is a further object of the present invention to provide an improved manner of mounting a wire screen coffee filtering element in a coffee cartridge so that it will not break loose under the water pressure involved. This is accomplished, in one embodiment of the present invention, by providing an annular screen holder that surrounds the perimeter of the wire filtering screen and clinches the ends of the wires so that they will not break loose under the pressure. The screen holder may be made of the same material as the can body, generally tin plate.

It is a further object of the present invention to provide an arrangement that will prevent flexing of the filter into contact with the can end over any substantial areas of the filter, because if this were to happen the area of the filter screen would be diminished to the extent of its area of contact with the bottom end of the can. In accordance with one preferred embodiment of the present invention, the center of the screen is supported by a dimple formed in the center of the can end. This dimple maintains the center of the filter in a fixed position, so that the surrounding filter areas are spaced from the can end.

In accordance with another embodiment of the present invention, a cloth filter is used. This filter is laminated to a perforated film of heat sealable plastic (Mylar). The film is then heat sealed to the screen holder ring, eliminating the cost of the operations required to clinch a filter screen to the ring.

It is a still further object of the present invention, to provide a "tin" can of the above mentioned character, wherein the top of the can is so shaped as to facilitate the formation of a liquid-tight seal between it and the water entry head of the brewing mechanism.

The attainment of the above and further objects of the present invention will be apparent from the following specification taken in conjunction with the accompanying drawing forming a part thereof.

In the drawing:

FIGURE 1 is a front view, in partial section, of a coffee containing cartridge embodying the present invention;

FIGURE 2 is a bottom view thereof;

FIGURE 3 is a top view of the web used in the screen holding ring;

FIGURE 4 is an enlarged fragmentary section of the bottom of the cartridge of FIGURE 1;

FIGURE 5 is a sectional view of a coffee brewing apparatus showing the manner of using the cartridge of the present invention thereon;

FIGURE 6 is a bottom plan view of a modified form of filter and filter ring assembly; and FIGURE 7 is a fragmentary transverse sectional view of FIGURE 6.

In the accompanying drawing like reference numerals designating like parts throughout.

A can embodying the present invention is illustrated at 1 in FIGURE 1. The can includes a conventional circular cylindrical can body 2, made of tin plate, black plate, or the like, which body is closed by a top can end 3, and a bottom can end 4 of the same material. The top can end comprises a dished disc 6, that is seam sealed at 7, to the can body 2, in the conventional manner. The disc 6 has an inclined annular wall 8, which is at an angle of the order of 9° with respect to the central longitudinal axis 10 of the can.

The bottom can end 4 includes a filter ring 12 and a can end disc 13. The filter ring has an annular axially extending flange 14 that fits within the body 2. The disc 13 is seamed to the body 2 by a seam 16, which also serves to lock the filter ring 12 in place within the can body to leave a substantially fixed space 17 between the disc 13 and the adjacent part of the filter ring 12.

The filter ring has an integrally formed web 18, in this instance in the form of three equally spaced arms extending from the inner periphery of the ring to the center thereof.

A circular wire mesh filter screen 20 is secured to the filter ring along the periphery of the screen by forming an S-shaped annular fold 22 which embraces and tightly grips the upper and lower surfaces of the filter screen along the periphery thereof. The web 18 is on the underside of the screen when the can is in the position shown in FIGURE 1, that is on the side of the screen that faces the can end disc 13. The fold 22 not only holds the filter screen in place but also prevents fraying or loosening of the wires at the edge of the screen. The disc 13 has a centrally located inwardly projecting dimple 24 that contacts and supports the center of the web 18 of the filter ring and thereby support the filter against sagging into contact with any appreciable area of the inner surface of the can end disc 13, since such contact would reduce the effective filter area of the screen.

The can body and the can ends are made of the materials usual in the can making industry, generally tin plate or black plate. The can end discs may be radially punctured as by a pointed puncturing tool that fulcrums at the seam between the disc and the can body, such as the puncturing tools usually used for puncturing the end of a beer can, for instance.

The main can space, indicated at 26, is filled, in this instance with ground coffee which is vacuum packed within the can, so that the vacuum protects the ground coffee from the deleterious action of oxygen upon the coffee oils.

When the can of FIGURE 1 is to be used for brewing drip coffee both ends of the can are pierced as indicated at 27 and 28, without piercing the filter screen 20. The can with its coffee contents is then placed in a coffee making device 30 illustrated in FIGURE 5. This device comprises a metal circular cup shaped receptacle 31 having a water outlet pipe or tube 32 and a cover or head 33 having a water inlet pipe or tube 34. The cover includes a pair of pins 36—36 that co-operate with slots in and a cam surface at the end of a flanged annular rim 38 of the cup receptacle. Upon turning of the cover with respect to the cup the pins engage inclined cam surfaces 39 on the bottom of the cup rim to secure the cover 33 to the cup. The cover or head 33 has a ring 40 welded on the inner side thereof which ring 40 has a groove for receiving an O ring 41. The O ring is of rubber or other sealing material and makes a sealing fit within the annular wall 8 of the can end disc 6. The tube 34 opens into the head space 42 above the can end disc 6. The cover or head 33 has a number of centering pins 44—44 for centering the device in an apparatus that supplies hot water at a pressure of, say, 15 pounds per square inch, to the water inlet pipe 34. The hot water flows into the head space 42, then through the pierced opening or openings 27 in the can end top 3, and then percolates through the ground coffee within the can 1, through the filter screen 20, and out through the space 17 to the pierced opening or openings 28 in the bottom can end disc 13, and exits through the water outlet pipe or tube 32 as brewed coffee. The filter screen 20 is of such degree of fineness that the water passes through it sufficiently slowly for the coffee brewing action to take place.

After the coffee has been brewed the coffee making device 30 is disconnected from the source of hot water, the cover 33 is removed from the cup 31, and the can 1 with its spent ground coffee is discarded. The receptacle may then be reused immediately for brewing another cartridge of coffee or it may be washed for future use.

During the brewing action it is desirable that the filter screen be so supported that the pressure thereon will not force or flex it into a position overlapping an appreciable surface of the can end disc 13. By supporting the filter at the center of the webbing 18, through the action of the dimple 24, such flexing is prevented.

Another way of making the filter is illustrated in the FIGURES 6 and 7. In this instance the filter is indicated at 50 and comprises a perforated metal disc 51 having a surrounding annular axially extending flange 14 as previously described, which is secured to the can end in the manner previously described. The webbing is in this instance formed by a large number of perforations 52 formed in the disc 51. The filter element consists of a cloth or other filter disc 53 that is sandwiched between two films of plastic material 54 of exceeding thinness each of which films has formed therethrough a very large number of holes or perforation 55. The plastic used is a heat sealable plastic such as for instance the material known as "Mylar." The cloth filter 53 with its outer films of plastic heat sealed thereto is then heat sealed to the webbing disc 51 of the holding ring 50. The holes 55 in the plastic are very close together, each hole being very much smaller than each hole 52 in the ring 50. The action of this filter is the same as the action of the screen previously described.

In compliance with the requirements of the patent statutes I have herein shown a preferred embodiment of the present invention. It is, however, to be understood that the invention is not limited to the precise construction shown, the same being merely illustrative of the principles of the invention. What is considered new and sought to be covered by Letters Patent is—

A can comprising a can body and can ends hermetically sealing both ends of the body, one of the can ends being a disc, a filter within the can body in spaced relationship to each of the can ends and being closer to the disc than to the other can end to permit filtering of liquid through the filter into the space between the filter and disc; said filter comprising a yieldable filter element and a ring, said ring having an inward projection, an outward projection folded back on the inward projection, and an additional inward projection, the outward projection and additional inward projection forming a seam pressing the opposite sides of the filter element along the periphery thereof; means at the central part of the disc for supporting the center of the filter element with respect to the disc to prevent sagging of the filter element into contact with any appreciable area of said disc, said ring having its peripheral portion surrounding the filter element and hermetically sealed to the body of the can, the disc being of frangible material to permit puncturing of the same by a tool to form an outlet for liquid that has passed through the filter, the spacing of the filter from the disc being sufficient to avoid piercing the filter by the puncturing tool.

References Cited by the Examiner

UNITED STATES PATENTS

| | | | |
|---|---|---|---|
| 812,654 | 2/06 | Hirsch | 160—379 X |
| 1,087,708 | 2/14 | Bendix | 210—495 |
| 1,468,411 | 9/23 | Ong | 210—495 |
| 1,831,290 | 11/31 | Daniel | 210—464 X |
| 2,109,160 | 2/38 | Yurkovich | 160—379 |
| 2,539,771 | 1/51 | Chambers | 99—235 X |
| 2,778,739 | 1/57 | Rodth | 99—235 X |
| 2,864,504 | 12/58 | Jepson | 210—495 X |
| 3,082,587 | 3/63 | Brimberg | 210—495 X |

FOREIGN PATENTS 42,152  12/37  Netherlands.

ROBERT E. PULFREY, *Primary Examiner.*

H. WARTIN, LAWRENCE CHARLES, JEROME SCHNALL, *Examiners.*